(12) United States Patent
Park et al.

(10) Patent No.: US 11,930,580 B2
(45) Date of Patent: Mar. 12, 2024

(54) COOKING APPARATUS

(71) Applicant: LG ELECTRONICS INC., Seoul (KR)

(72) Inventors: Kyoungjoon Park, Seoul (KR); Jaekyung Yang, Seoul (KR); Eunkyoung Yoon, Seoul (KR); Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 849 days.

(21) Appl. No.: 16/477,961

(22) PCT Filed: Jan. 17, 2018

(86) PCT No.: PCT/KR2018/000816
§ 371 (c)(1),
(2) Date: Jul. 15, 2019

(87) PCT Pub. No.: WO2018/139804
PCT Pub. Date: Aug. 2, 2018

(65) Prior Publication Data
US 2020/0128633 A1 Apr. 23, 2020

(30) Foreign Application Priority Data
Jan. 25, 2017 (KR) .................. 10-2017-0012322

(51) Int. Cl.
H05B 6/64 (2006.01)
A47J 37/06 (2006.01)
(52) U.S. Cl.
CPC ........ *H05B 6/6408* (2013.01); *A47J 37/0629* (2013.01); *A47J 37/0664* (2013.01)
(58) Field of Classification Search
CPC ..... A47B 88/40; A47B 88/401; A47B 88/407; A47B 88/50; A47B 88/60; A47J 37/0629;
(Continued)

(56) References Cited

U.S. PATENT DOCUMENTS 5,746,118 A * 5/1998 Brunner .................. F24C 15/16
126/41 R
9,022,496 B2 5/2015 Armstrong et al.
(Continued)

FOREIGN PATENT DOCUMENTS

KR 10-2007-0077826 7/2007
KR 10-2013-0088269 8/2013
(Continued)

OTHER PUBLICATIONS

Vocabulary definition for "damper" (Year: 2022).*
(Continued)

*Primary Examiner* — Tu B Hoang
*Assistant Examiner* — Bonita Khlok
(74) *Attorney, Agent, or Firm* — KED & ASSOCIATES

(57) ABSTRACT

Provided is a cooking apparatus. The cooking apparatus includes a cabinet having a cooking space therein, a tray on which an object to be cooked is placed on a top surface thereof, and a pair of elevation devices configured to connect both side surfaces of the inside of the cabinet to both side surfaces of the tray, the pair of elevation devices being configured so that the tray is insertable into and withdrawable from the cooking space. Each of the pair of elevation devices includes a fixed rail fixed to a side surface of the cabinet, a movable rail configured to move in a front and rear direction along the fixed rail in a state of being connected to the fixed rail, and an arm member having one end rotatably connected to an outer surface of the movable rail and the other end connected to a side surface of the tray to elevate the tray. The arm member includes a front arm and a rear arm, which are disposed to be spaced apart from each other in the front and rear direction.

10 Claims, 12 Drawing Sheets

(58) Field of Classification Search
CPC ... A47J 37/0664; F24C 15/168; F24C 15/162; H05B 6/6408–6411; A21B 1/00; A21B 1/50; A21B 3/13–137
USPC .......... 219/752–753, 762–763; 99/448–449, 99/450; 211/153, 187, 150, 168–174, 211/90.02–90.3, 96; 126/339, 340, 41 D, 126/41 E, 338–337 A; 312/126, 133, 312/135–136
See application file for complete search history.

(56) References Cited

U.S. PATENT DOCUMENTS

| | | | |
|---|---|---|---|
| 2014/0239788 A1* | 8/2014 | Turner | F24C 15/16 |
| | | | 312/350 |
| 2014/0285078 A1* | 9/2014 | Armstrong | F24C 15/16 |
| | | | 312/312 |
| 2016/0174707 A1* | 6/2016 | Chan | E05C 17/02 |
| | | | 312/333 |

FOREIGN PATENT DOCUMENTS

| KR | 10-2015-0026378 | 3/2015 |
|---|---|---|
| KR | 10-2015-0141797 | 12/2015 |

OTHER PUBLICATIONS

International Search Report (with English Translation) and Written Opinion dated Apr. 23, 2018 issued in Application No. PCT/KR2018/000816.

\* cited by examiner

COOKING APPARATUS

CROSS-REFERENCE TO RELATED PATENT APPLICATIONS

This application is a U.S. National Stage Application under 35 U.S.C. §371 of PCT Application No. PCT/KR2018/000816, filed Jan. 17, 2018, which claims priority to Korean Patent Application No. 10-2017-0012322, filed Jan. 25, 2017, whose entire disclosures are hereby incorporated by reference.

BACKGROUND

The present disclosure relates to a cooking apparatus.

In general, cooking apparatuses are home appliances for cooking food and include electric ovens, microwaves, and the like.

Particularly, electric ovens are devices that captures vapor generated in food together with heat in the ovens to heat and cook the food.

The existing oven has a structure in which waist is bent so as to insert or withdraw an object to be cooked into or from a cooking space. As a result, when it needs to cook a heavy object to be cooked, a user feels uncomfortable.

A cooking appliance disclosed in the following prior art is characterized in that a rack on which an object to be cooked is placed is adjustable in height. However, in the case of the oven disclosed in the following prior art, the rack may be adjusted in height only within the cooking space, and also, the height of the rack may not be largely adjusted.

In order to solve the inconvenience felt by the user, it is required that a tray or rack on which an object to be cooked has to be elevated in a state of being withdrawn, and it is required that the tray or the rack has to ascend up to a sufficient height so as not to allow the user to bend the waist.

However, the following prior art may have a disadvantage in that the consumer needs are not satisfied.

(Patent Document 1) Korean Patent Publication No. 2015-0141797 (Dec. 21, 2015)

SUMMARY

The present disclosure has been proposed to improve the above-described limitations.

In one embodiment, a cooking apparatus includes: a cabinet having a cooking space therein; a tray on which an object to be cooked is placed on a top surface thereof; and a pair of elevation devices configured to connect both side surfaces of the inside of the cabinet to both side surfaces of the tray, the pair of elevation devices being configured so that the tray is insertable into and withdrawable from the cooking space, wherein each of the pair of elevation devices includes: a fixed rail fixed to a side surface of the cabinet; a movable rail configured to move in a front and rear direction along the fixed rail in a state of being connected to the fixed rail; and an arm member having one end rotatably connected to an outer surface of the movable rail and the other end connected to a side surface of the tray to elevate the tray, wherein the arm member includes a front arm and a rear arm, which are disposed to be spaced apart from each other in the front and rear direction.

The details of one or more embodiments are set forth in the accompanying drawings and the description below. Other features will be apparent from the description and drawings, and from the claims.

DETAILED DESCRIPTION OF THE EMBODIMENTS

Hereinafter, an oven according to an embodiment will be described in detail as an example of a cooking apparatus including a tray elevation device according to an embodiment. It is noted that the elevation device is applicable not only to an oven but also to a microwave oven.

Figure 1:
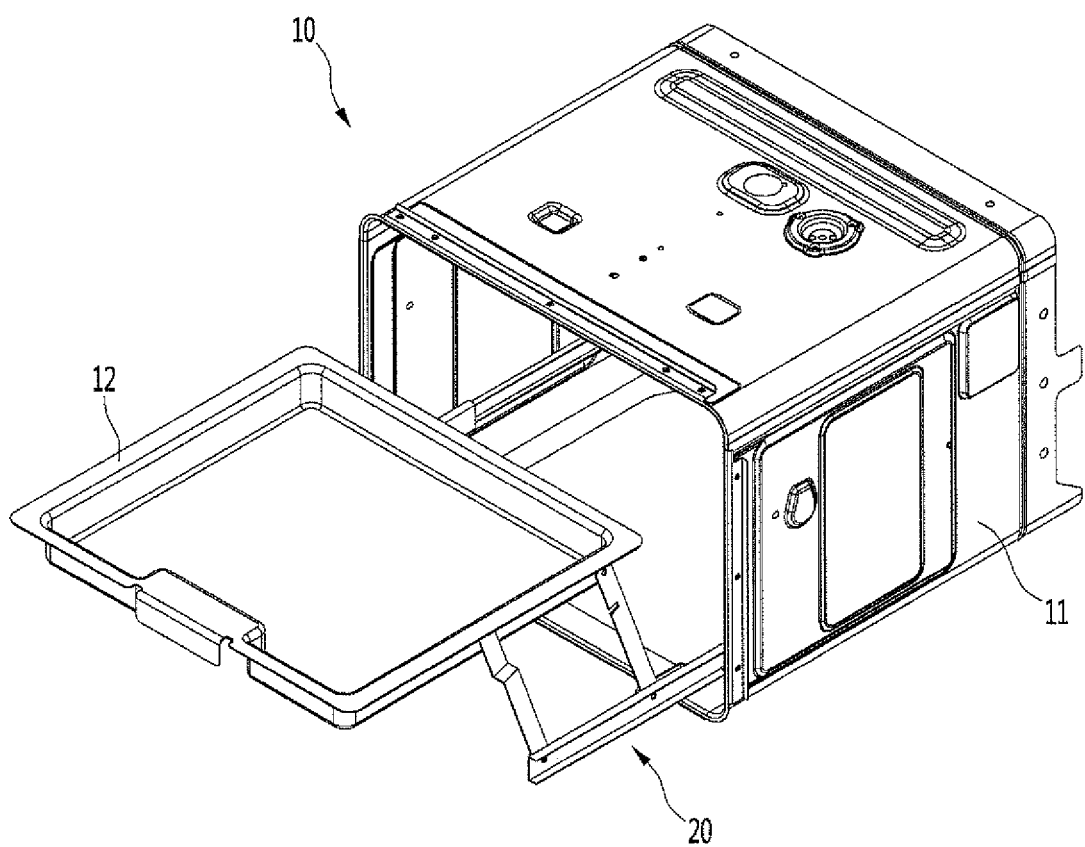
FIG. 1 is a perspective view of an electric oven to show a state in which a tray ascends after being withdrawn according to an embodiment.

FIG. 1 is a perspective view of an electric oven to show a state in which a tray ascends after being withdrawn according to an embodiment.

Referring to FIG. 1, an oven 10 as an example of a cooking appliance according to an embodiment may include a cabinet 11 having a cooking space therein, a tray 12 that is withdrawably accommodated in the cabinet 11 and having a top surface on which an object to be cooked is placed, and a pair of elevation devices 20 that enable the tray 12 to be withdrawn and elevated.

The pair of elevation devices 20 may be respectively mounted on inner left and right surfaces of the cabinet 11 and respectively connected to left and right surfaces of the tray 12.

In detail, the tray 12 is slidably movable in a front and rear direction in a state of being connected to the elevation device 20. Also, the tray 12 is configured so that a user lifts the tray while holding and pulling the tray 12 forward in a state in which the tray 12 is maximally withdrawn forward. On the other hand, when the user pushes the tray backward in a state in which the tray 12 ascends up to a maximum height, the tray 12 descends while moving backward.

Hereinafter, a configuration and function of the elevation device 20 that enables the tray 12 to be inserted/withdrawn and elevated will be described.

Figure 2:
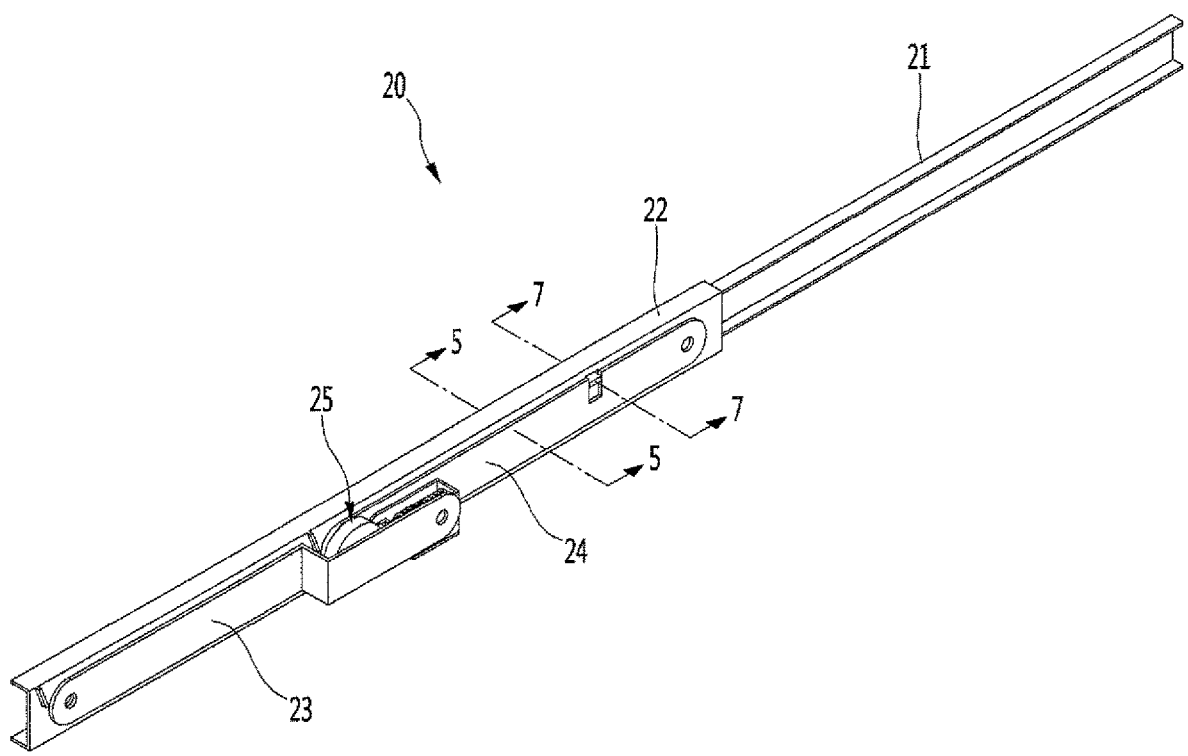
FIG. 2 is a perspective view of an elevation device according to an embodiment.
Figure 3:
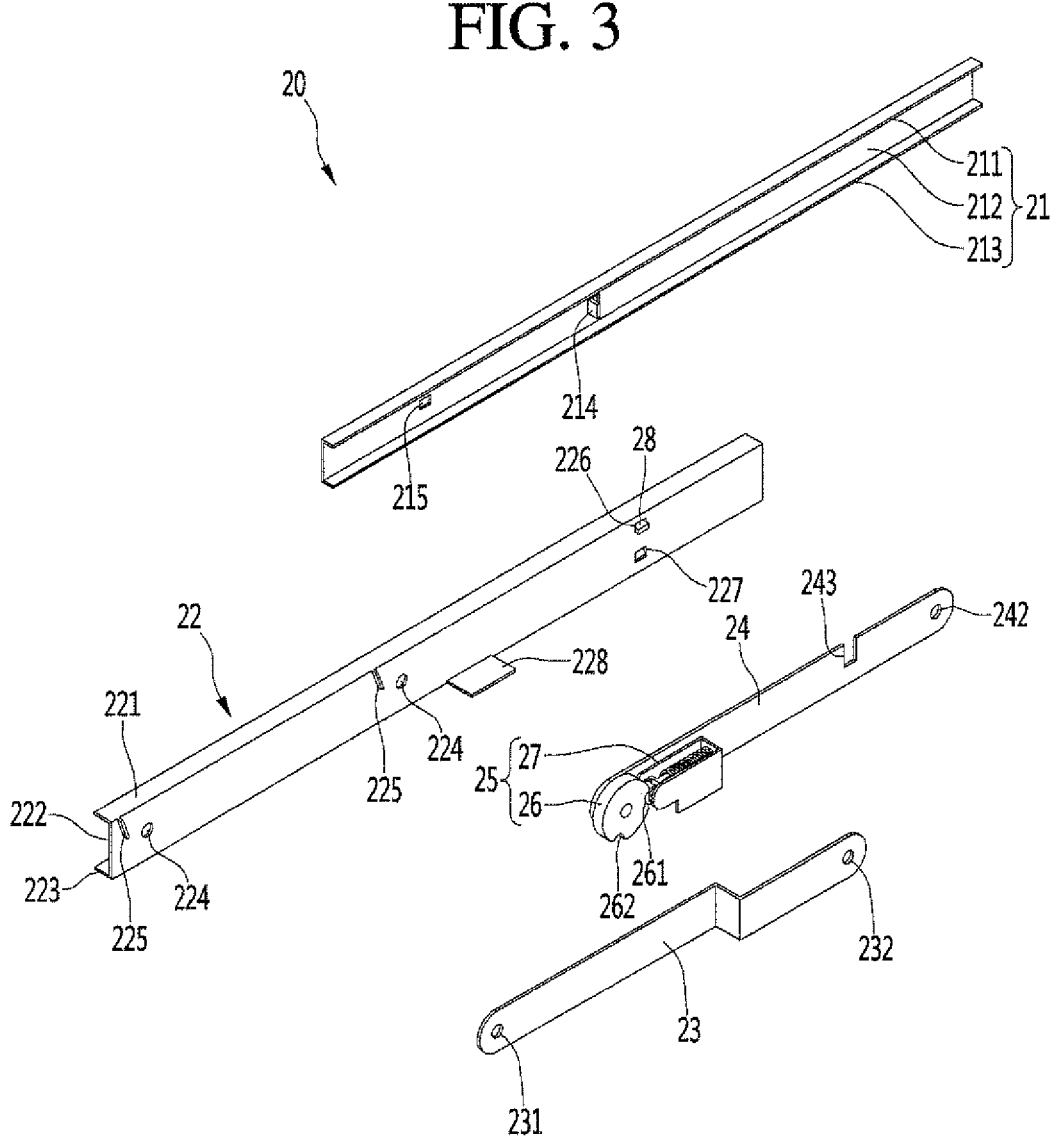
FIG. 3 is an exploded perspective view of the elevation device.

FIG. 2 is a perspective view of the elevation device according to an embodiment, and FIG. 3 is an exploded perspective view of the elevation device.

Referring to FIGS. 2 and 3, the elevation device 20 according to an embodiment may include a fixed rail 21 fixed to a side surface of the cabinet 11, a movable rail 22 that is slidably movable in the front and rear direction in a state of being connected to the fixed rail 21, a front arm 23 and a rear arm 24, each of which has one end rotatably connected to one surface of the movable rail 22 and the other end rotatably connected to a side surface of the tray 12, a stopper unit 25 connected to one of the front arm 23 and the rear arm 24 to prevent the front arm 23 and the rear arm 24 from excessively rotating, and a latch unit 28 disposed on the other surface of the movable rail 22.

In detail, the fixed rail 21 may have a longitudinal cross-section having a '⊏' shape. That is, the fixed rail 21 includes a side surface portion 212 contacting the side surface of the cabinet 11, a top surface portion 211 bent horizontally from an upper end of the side surface portion 212, and a bottom surface portion 213 bent horizontally from a lower end of the side surface portion 212.

Also, a withdrawal restriction rib 214 protrudes from a surface opposite to the surface contacting the cabinet 11. The withdrawal restriction rib 214 may restrict a forward moving length of the movable rail 22 and be disposed at any point that is closer to a front end of the fixed rail 21. The position of the withdrawal restriction rib 214 may be decided according to a design condition of the withdrawn length of the movable rail 22.

Also, a movement restriction hole 215 may be defined in any point of the side surface portion 212 of the fixed rail 21. The movement restriction hole 215 may be defined at a point that is spaced a predetermined distance forward from the withdrawal restriction rib 214. A function of the movement restriction hole 215 will be described in detail with reference to the accompanying drawings.

The movable rail 22 has a longitudinal cross-section with a '⊏' shape like the fixed rail and is constituted by a top surface portion 221, a side surface portion 222, and a bottom surface portion 223. Also, the top surface portion 221 and the bottom surface portion may contact outer surfaces of the top surface portion and the bottom surface portion 213 of the fixed rail 21. Also, a bearing member (not shown) may be disposed on each of the contact portions of the top surface portions 211 and 221 and the contact portions of the bottom surface portions 213 and 223 so that the movable rail 22 smoothly moves in a state of being connected to the fixed rail 21.

Figure 5:
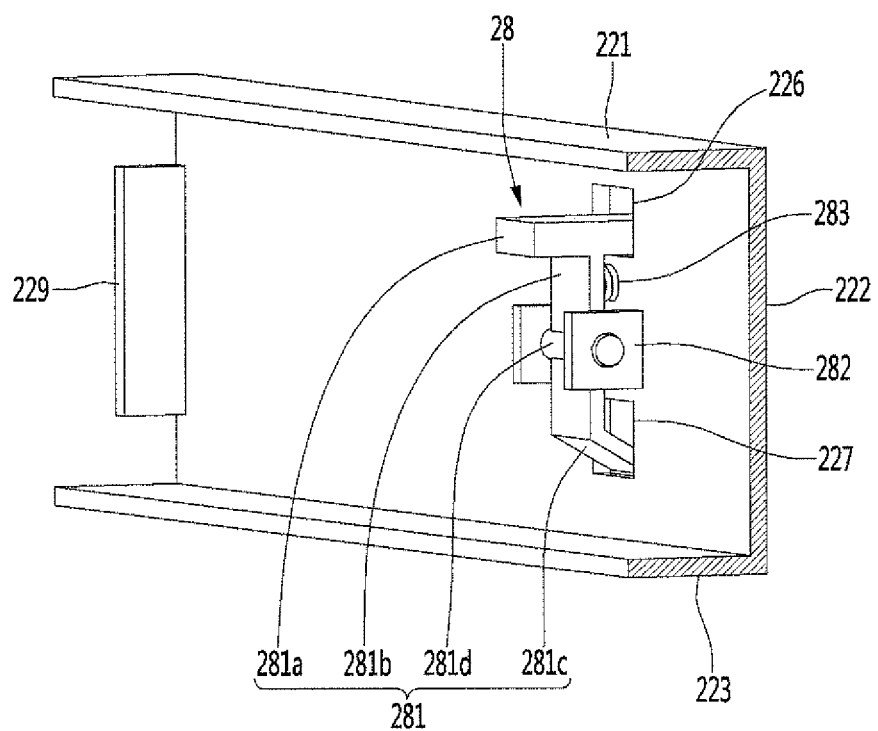
FIG. 5 is a cutaway perspective view of a movable rail taken along line 5-5 of FIG. 2.

Also, a hook end 229 may protrude from the side surface portion 222 of the movable rail 22 (see FIG. 5). The hook end 229 may be hooked with the withdrawal restriction rib 214 when the movable rail 22 is withdrawn forward to set a withdrawable limit of the movable rail 22.

Also, an upper hole 226 and a lower hole 227 may be defined in points that are spaced forward from the rear end of the side surface portion 222, respectively. The upper hole 226 and the lower hole 227 may be spaced apart from each other in a vertical direction and be defined in the same straight-line. Also, the latch unit 28 may be mounted on the side surface portion 223 at each of the point in which the upper hole 226 and the lower hole 227 are defined. In detail, the latch unit 28 may be mounted on a surface facing the side surface portion 212 of the fixed rail 21.

Also, coupling holes 224 through which coupling members connecting ends of the front arm 23 and the rear arm 24 to each other pass may be defined in the side surface portion of the movable rail 22.

Also, support ribs 225 may be disposed on the side surface portion 223 of the movable rail 22. In detail, the support ribs 225 may be provided to restrict the rotation of the front arm 23 and the rear arm 24.

The support ribs 225 may be disposed on an outer surface of the side surface portion 223, i.e., a surface that is opposite to the surface on which the latch unit 28 is disposed. Also, the support ribs 225 may extend to be inclined at a predetermined angle forward from a straight line and then be obliquely fixed in a state in which the front arm 23 and the rear arm 24 elevate the tray 12 as illustrated in FIG. 1. The front arm 23 and the rear arm 24 may not further rotate forward by the support ribs 225 in the state in which the tray 12 is elevated.

Also, the support ribs 225 may be called a front rib that restricts the rotation of the front arm 23 and a rear rib that restricts the rotation of the rear arm 24. The support ribs 225 are disposed in the front of the upper side of the coupling holes 224. That is, the support ribs 225 may be disposed on the positions at which the front arm 23 and the rear arm 24 are supported in a state in which the front arm 23 and the rear arm 24 maximally rotate with respect to the coupling holes 224.

Each of the front arm 23 and the rear arm 24 may be provided in a link shape and be rotatably connected to the movable rail 22 at points that are spaced a predetermined distance from each other in the front and rear direction.

A rail coupling hole 231 may be defined in one end of the front arm 23, and a tray coupling hole 232 may be defined on the other end of the front arm 23. Also, the front arm 23 may be bent to avoid an interference with the stopper unit 25.

Also, a rail coupling hole may be defined in one end of the rear arm 24, and a tray coupling hole 242 may be defined in the other end of the rear arm 24. Also, an avoidance groove 243 may be defined in a point that is spaced apart from the other end of the rear arm 24. The avoidance groove 243 is recessed by a predetermined depth downward from the upper end of the rear arm 24.

A stopper unit 25 may be mounted on one end of one or all of the front arm 23 and the rear arm 24. Hereinafter, a structure in which the stopper unit 25 is disposed on one end (or a front end) of the rear arm 24 will be described as an example. When the stopper unit 25 is disposed on the one end (or the front end) of the front arm 23, the front arm 23 may not be bent but be disposed in a straight-line shape.

In detail, the stopper unit 25 may include a cam 26 connected to one end of the rear arm 24 (or the front arm) and a damper that restricts rotation of a cam 26. The coupling member passing through the one end of the rear arm 24 sequentially passes through the cam 26, the one end of the rear arm 24, and the coupling hole 224 defined in the side surface portion of the movable rail 22. Also, the rear arm 24 and the cam 26 may rotate in one body.

Also, a first stopping groove 261 and a second stopping groove 262 may be defined in a circumferential surface of the cam 26, and the stopping grooves 261 and 262 may be defined at positions that are spaced apart from each other in a circumferential direction. In the state in which the rear arm 24 is parallel to the movable rail 22, i.e., the tray 12 is not elevated, a bearing 272 (see FIG. 4) of the damper 27 is maintained in a state of being hooked with the first stopping groove 261. Also, in a state in which the rear arm 25 rotates to enter the state of FIG. 1, i.e., the tray 12 maximally ascends, the bearing 272 may be hooked with the second stopping groove 262 to prevent the rear arm 24 from rotating reversely. In addition, the user may recognize that the ascending and descending of the tray 12 are completed through a click sound that is generated when the bearing 272 is hooked with the stopping grooves 261 and 262.

Figure 4:
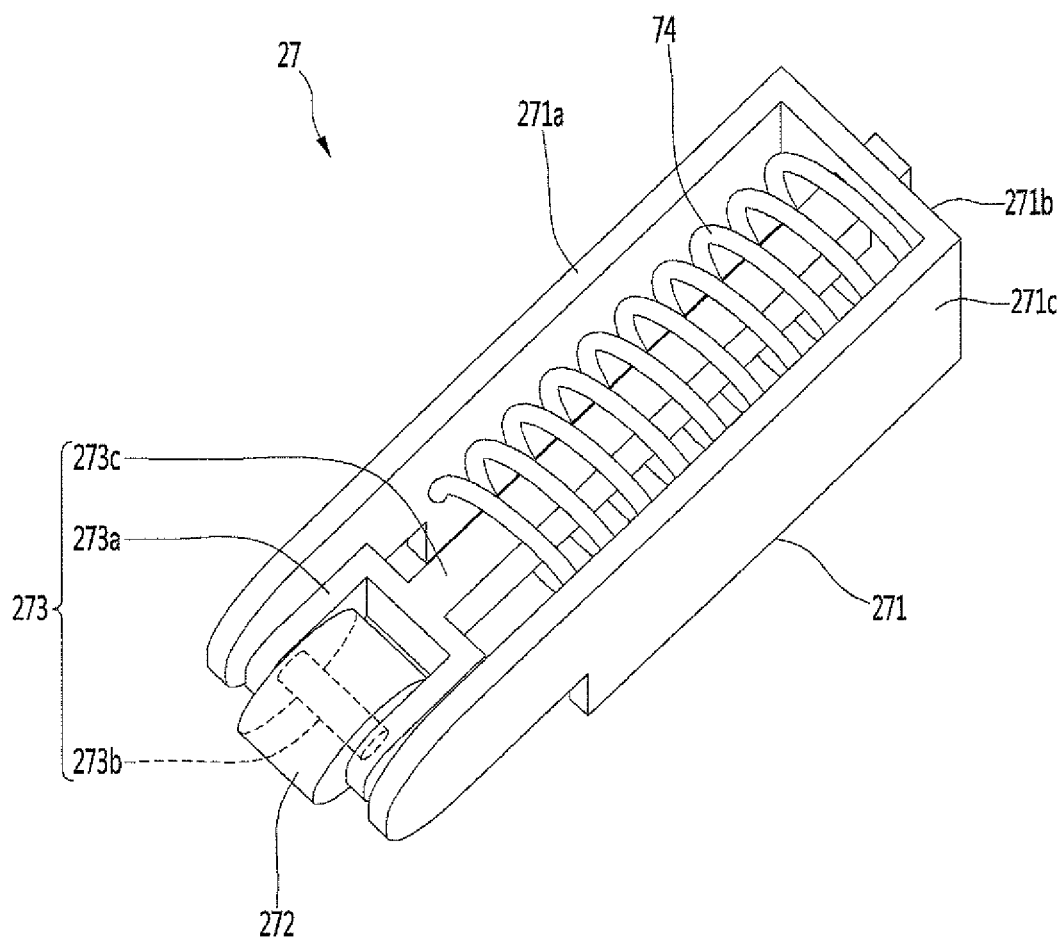
FIG. 4 is a perspective view of a damper constituting a stopper unit according to an embodiment.

FIG. 4 is a perspective view of the damper constituting the stopper unit according to an embodiment.

Referring to FIG. 4, the damper 27 may include a bracket 271 having a U-shaped cross-section, a bearing supporter 273 mounted to be movable in the front and rear direction within the bracket 271, and a bearing 272 mounted on a front end of the bearing supporter 273.

In detail, the bracket 271 includes left and right side surface portions 271a and 271c and a rear surface portion 271b connecting a rear end of the left side surface portion 271a to a rear end of the right side surface portion 271c.

Also, the bearing supporter 273 may include a bearing accommodation part 273a having a U shape, a bearing shaft 273b connecting both side surface portions of the bearing accommodation part 273a to each other, and a support rod 273c extending from a rear end of the bearing accommodation part 273a to pass through a rear surface of the bracket 271 so as to be inserted.

Also, the bearing shaft 273b may pass through the bearing 272 to serve as a rotational shaft of the bearing 272. Also, an elastic member 74 may be inserted onto the outside of the support rod 273c to apply elastic force to the bearing supporter 273.

According to the above-described constituents, in a state in which the bearing 272 is not inserted into the stopping grooves 261 and 262 of the cam 26, the bearing supporter 273 may move backward to contract the elastic member 74. Also, when the cam 26 rotates to allow the stopping grooves 261 and 262 to be disposed in the front of the bearing 272, the bearing 272 may be inserted into the stopping grooves 261 and 262 by the restoring force of the elastic member 274.

FIG. 5 is a cutaway perspective view of the movable rail taken along line 5-5 of FIG. 2.

Referring to FIG. 5, the latch unit 28 is disposed on an inner surface of the movable rail 22.

In detail, the latch unit 28 includes a latch 281, a pair of support ribs 282 tiltably supporting the latch 281, and an elastic member 283 pressing the latch 281.

In more detail, the latch 281 includes a latch head 281a, a latch body 281b extending downward from a center of a bottom surface of the latch head 281a, a latch leg 281c bent to a lower end of the latch body 281b, a rotational shaft 281d extending from a center of the latch body 281b in the front and rear direction, and a spring support rib 281e protruding from the latch body 281b. The elastic member 283 is inserted onto an outer circumferential surface of the spring support rib 281e, and the spring support rib 281e is disposed above the rotational shaft 281d. Thus, moment using the rotational shaft 281d as a center may act on the latch 281 by the restoring force of the elastic member 283. Also, front and rear ends of the rotational shaft 281d are coupled to the pair of support ribs 282 that are disposed in the front and rear direction.

The right end of the latch head 281a is inserted into the upper hole 226, and the left end is selectively inserted into a movement restriction hole 215 defined in the fixed rail 21. Also, the latch led 281c is inserted into the lower hole 227.

Figure 6:
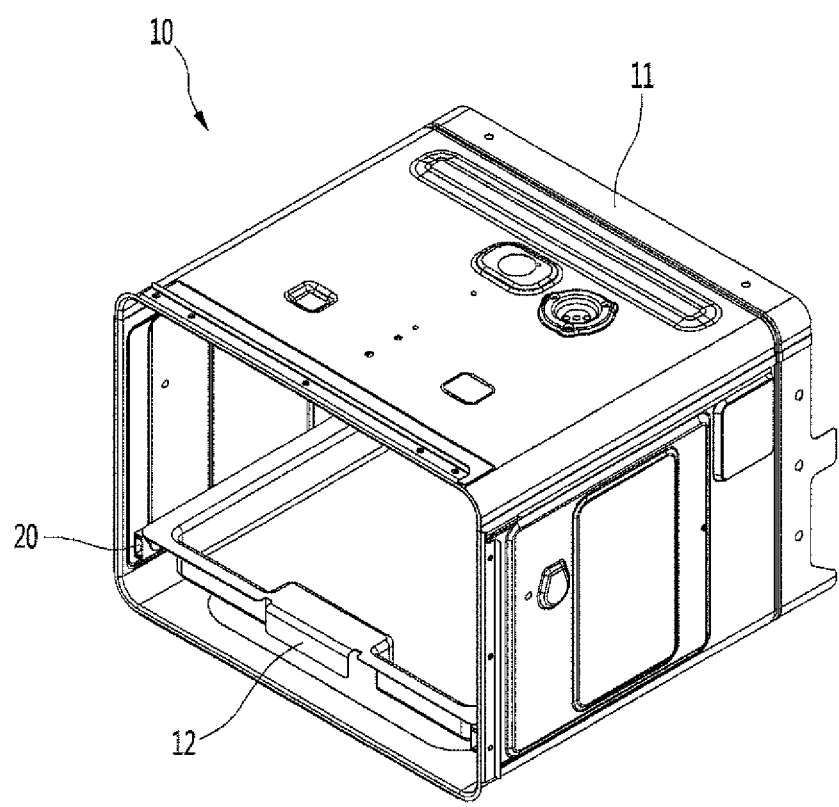
FIG. 6 is a perspective view of an oven to show a state before a tray is withdrawn.
Figure 7:
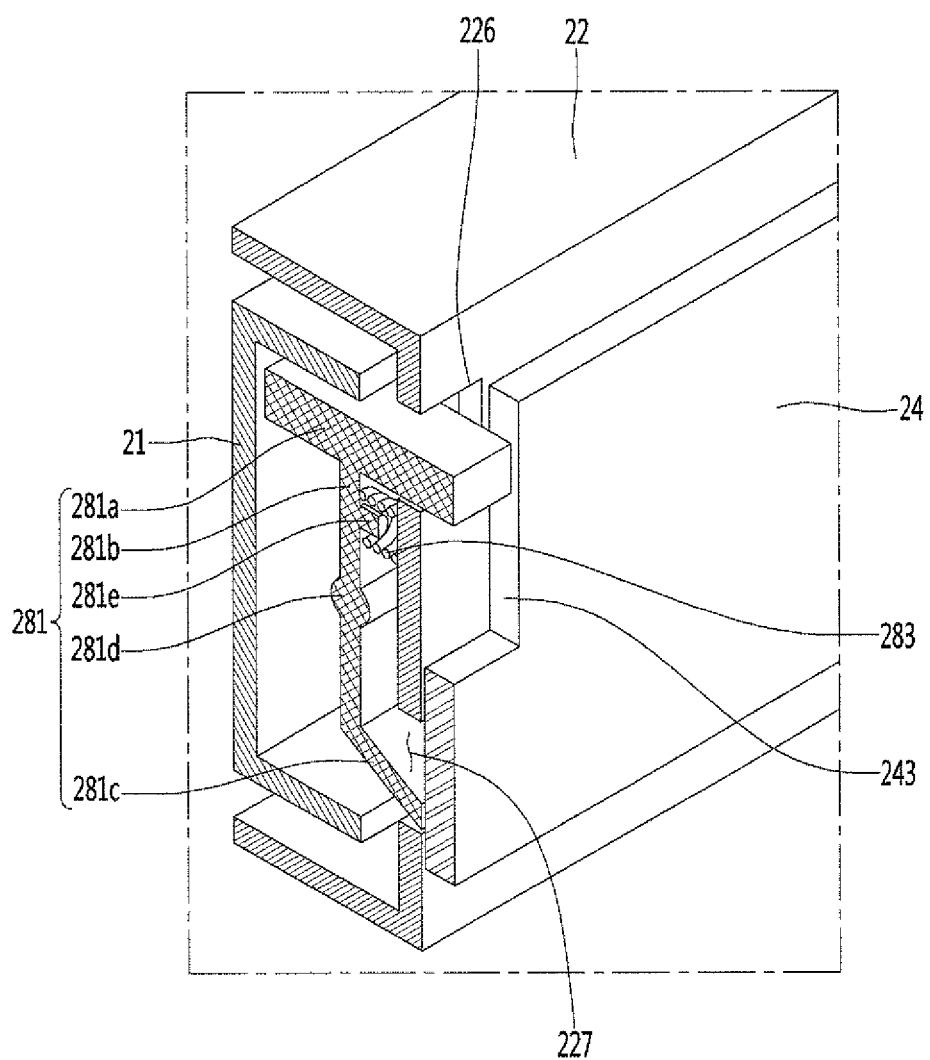
FIG. 7 is a longitudinal cutaway view taken along line 7-7 of FIG. 2.

FIG. 6 is a perspective view of an oven to show a state before the tray is withdrawn, and FIG. 7 is a longitudinal cutaway view taken along line 7-7 of FIG. 2 before the tray is withdrawn.

Referring to FIGS. 6 and 7, before the tray 12 is withdrawn, the left end of the latch head 281a is maintained to contact the side surface portion 212 of the fixed rail 21, and the right end is maintained to be inserted into the upper hole 261. Also, the elastic member 283 is maintained in a state of being compressed. Also, the latch leg 281c is maintained to be inserted into the lower hole 227.

Figure 8:
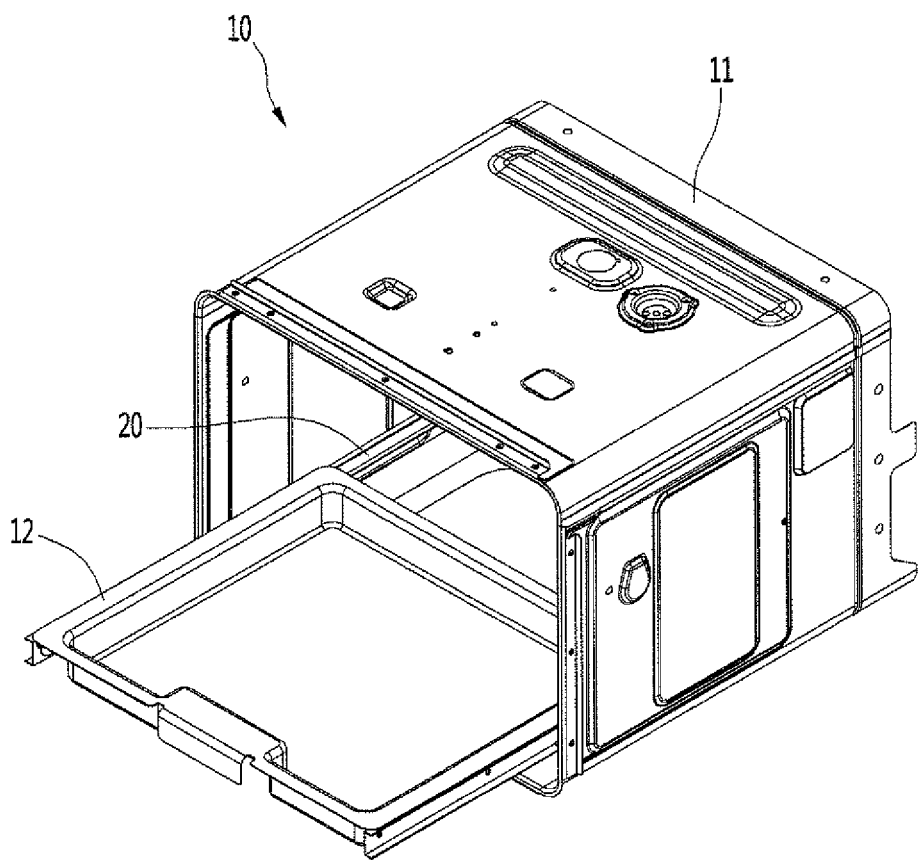
FIG. 8 is a perspective view of the oven to show a state in which the tray is maximally withdrawn.
Figure 9:
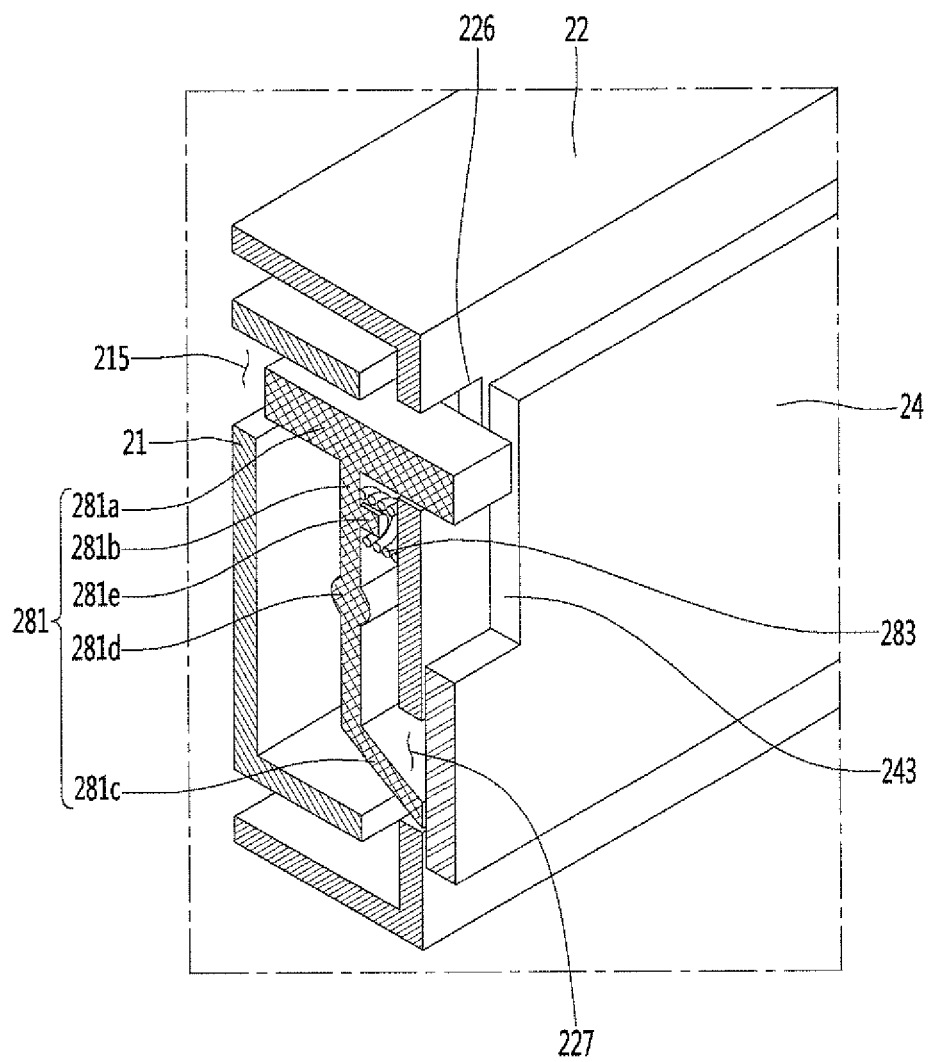
FIG. 9 is a longitudinal cutaway view taken along line 7-7 of FIG. 2 in the state in which the tray is maximally withdrawn.

FIG. 8 is a perspective view of the oven to show a state in which the tray is maximally withdrawn, and FIG. 9 is a longitudinal cutaway view taken along line 7-7 of FIG. 2 in the state in which the tray is maximally withdrawn.

Referring to FIGS. 8 and 9, the tray 12 may be withdrawn until the hook end 229 (see FIG. 5) disposed on the rear end of the movable rail 22 is hooked with the withdrawal restriction rib 214 (see FIG. 3) disposed on the side surface portion 212 of the fixed rail 21.

In the state in which the hook end 229 is hooked with the withdrawal restriction rib 214, a left end of the latch head 281a is aligned with the movement restriction hole 215 defined in the fixed rail 21. Also, a right end of the latch head 281a may pass through the upper hole 226 and be placed on the avoidance groove 243 defined in the rear arm 24.

However, since the lower hole 227 is blocked by the rear arm 24, the latch leg 281c may pass through the lower hole 227 and then be maintained in the state of contacting the rear arm 24.

Figure 10:
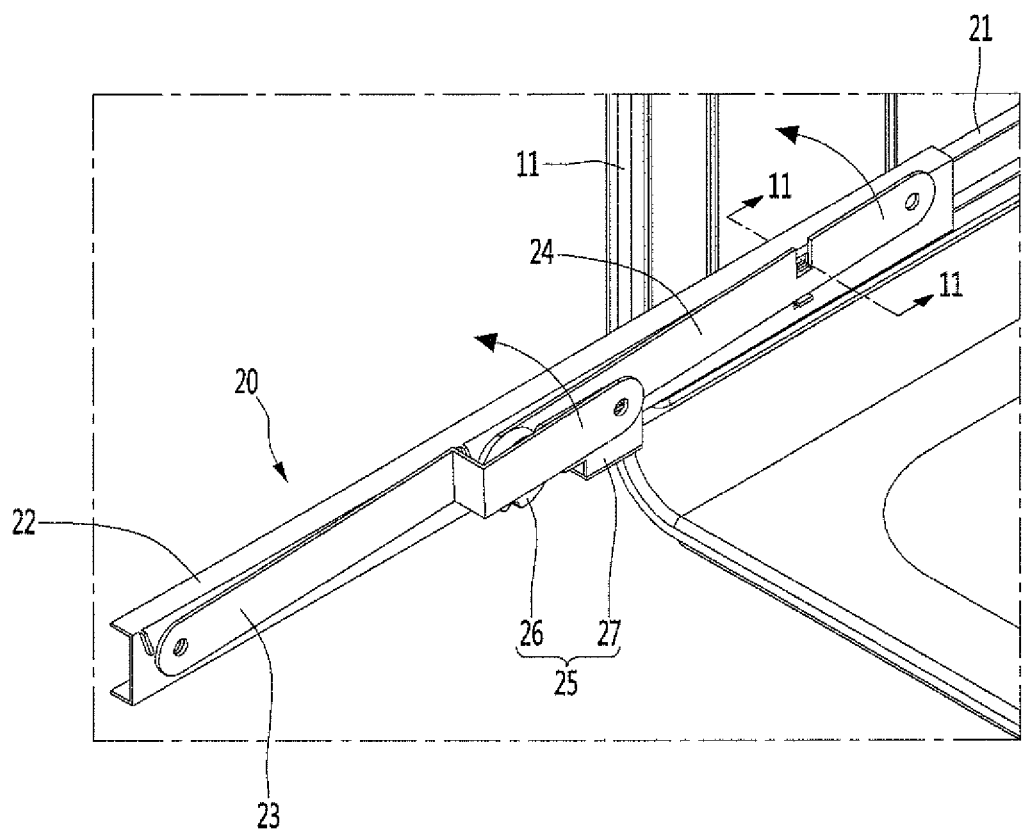
FIG. 10 is a perspective view of an elevation device to show a state in which the tray is ascending in the state in which the tray is maximally withdrawn.
Figure 11:
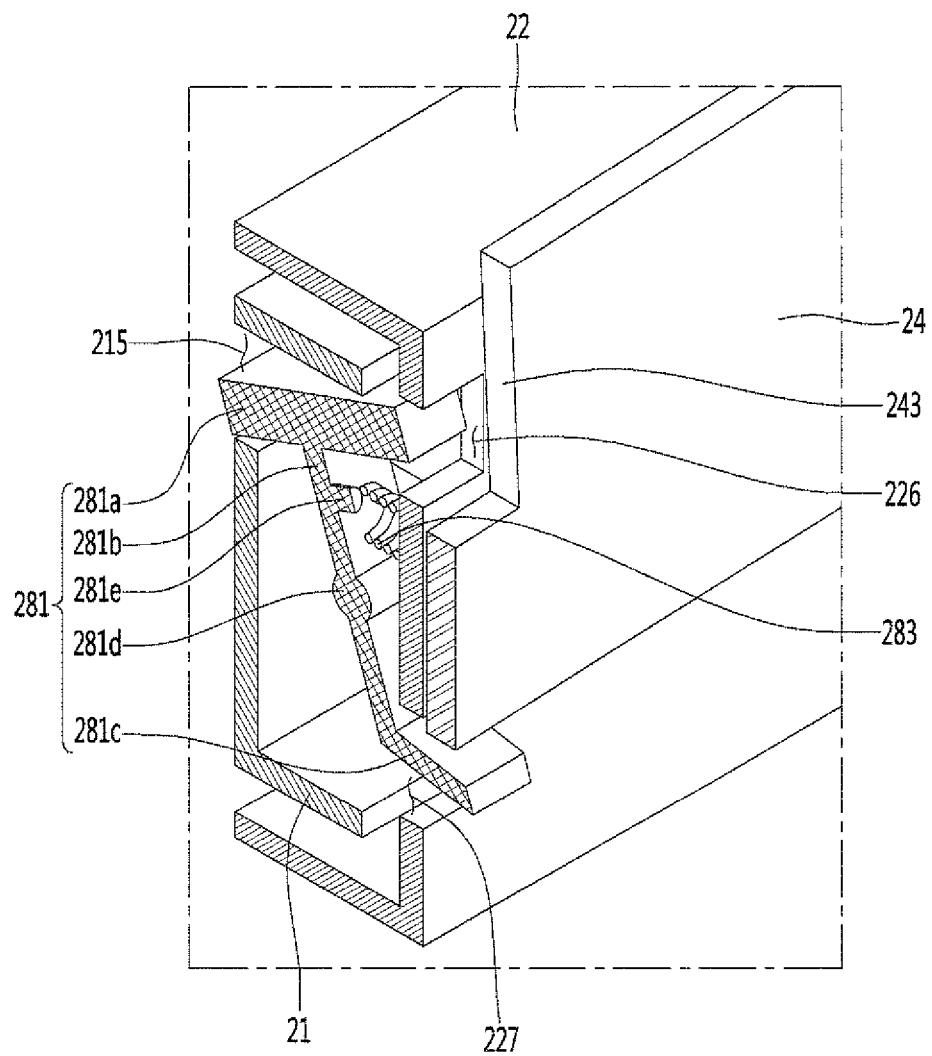
FIG. 11 is a cutaway perspective view taken along line 11-11 of FIG. 10.

FIG. 10 is a perspective view of an elevation device to show a state in which the tray is ascending in the state in which the tray is maximally withdrawn, and FIG. 11 is a cutaway perspective view taken along line 11-11 of FIG. 10.

Referring to FIGS. 10 and 11, in the state in which the tray 12 is maximally withdrawn, when the tray 12 is lifted, the front arm 23 and the rear arm 24 rotate. Also, the lower hole 227 that is in the closed state is opened by the rotation of the rear arm 24.

As a result, the latch 281 rotates with respect to the rotation shaft 281d by the restoring force of the elastic member 283. Then, the left end of the latch head 281a is inserted into the movement restriction hole 215. Simultaneously, the right end of the latch head 281a is withdrawn from the upper hole 226.

When the left end of the latch head 281a is inserted into the movement restriction hole 215, the movable rail 22 does not move forward or backward along the fixed rail 21. Thus, the tray 12 may stably ascend.

Figure 12:
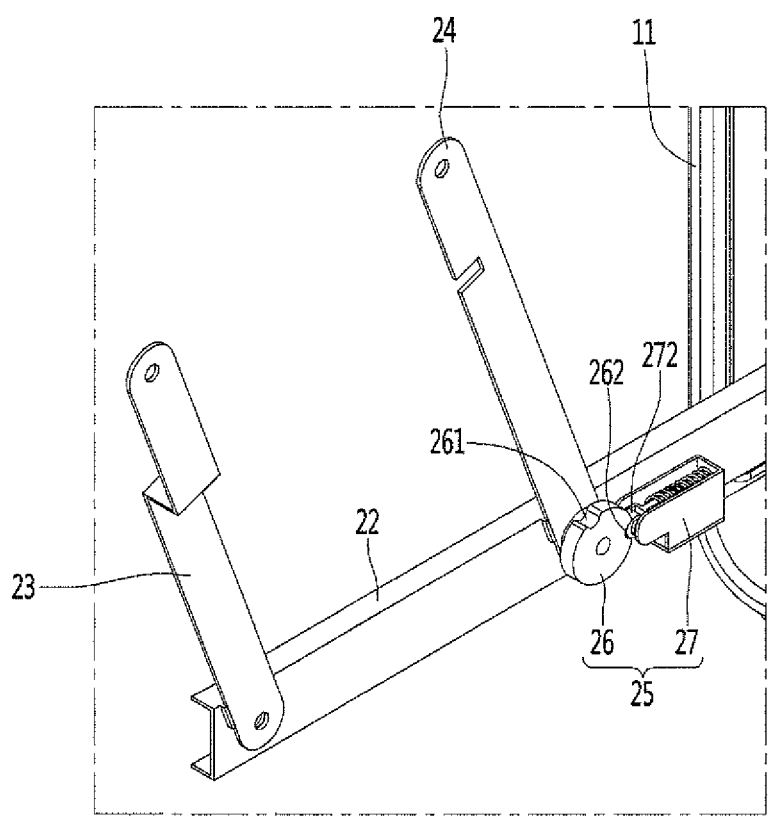
FIG. 12 is a perspective view of the elevation device to show a state in which a front arm and a rear arm maximally rotate to be in a state of FIG. 1.

FIG. 12 is a perspective view of the elevation device to show a state in which the front arm and the rear arm maximally rotate to be in a state of FIG. 1.

Referring to FIG. 12, when the rotation of the front arm 23 and the rear arm 24 start, the bearing 272 may be separated from the first stopping groove 261 of the cam 26, and then, in the rear arm 24 maximally rotates, the bearing 272 may be inserted into the second stopping groove 262. Also, the front arm 23 and the rear arm 24 may be supported by the support ribs 225 disposed on the side surface portion 223 of the movable rail 22 and also do not rotate forward any more.

Thus, in the state in which the tray 12 ascends, a phenomenon in which food drops down by weight thereof may be prevented. Also, since the front arm 23 and the rear arm 24 further rotate forward at a predetermined angle from a vertical surface and is maintained in an inclined state, the tray 12 may not rotate backward any more.

The cooking apparatus according to the embodiment may have the following effects.

First, since the tray ascends in the state of being withdrawn from the cabinet, it may be unnecessary to largely bend the waist when the user places the object to be cooked on the tray or lifts the cooked food from the tray.

Second, since the safety device that prevents the rail from moving backward in the state in which the tray ascends and the safety device that prevents the tray from descending by the self-weight in the state in which the tray ascends are provided, the usage safety may be secured.

Third, the structure that enables the tray to be elevated may be simplified to reduce the manufacturing cost.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking apparatus, comprising:
    a cabinet having a cooking space therein;
    a tray on a top surface of which an object to be cooked is placed; and
    a pair of elevation devices configured to connect side surfaces of an inside of the cabinet to side surfaces of the tray, the pair of elevation devices being configured so that the tray is insertable into and withdrawable from the cooking space, wherein each of the elevation device comprises:
        a fixed rail fixed to one of the side surfaces of the cabinet;
        a movable rail configured to move in frontward and rearward directions along the fixed rail in a state of being connected to the fixed rail;
        an arm member having a first end rotatably connected to an outer surface of the movable rail and a second end connected to one of the side surfaces of the tray to elevate the tray, wherein the arm member comprises a front arm and a rear arm, which are spaced apart from each other in the frontward and rearward directions;
        a latch unit disposed on an inner surface of the movable rail and configured to restrict movement of the movable rail when the arm member rotates to elevate the tray; and
        an elastic member interposed between the latch unit and the inner surface of the movable rail, wherein the latch unit is mounted on the inner surface of the movable rail facing a side surface of the fixed rail and includes a latch, wherein the movable rail comprises:
            an upper hole into which a first end of the latch is inserted; and
            a lower hole into which a second end of the latch is inserted, wherein, when the arm member is not rotated, the lower hole is covered by the rear arm, and when the rear arm is rotated to open the lower hole, the latch is rotated by a restoring force of the elastic member, and the first end of the latch is moved out of the upper hole by the rotation of the latch.

2. The cooking apparatus according to claim 1, wherein each of the elevation devices comprises:
    a withdrawal restriction rib protruding from the side surface of the fixed rail; and
    a hook end protruding from a rear end of the movable rail so as to be hooked with the withdrawal restriction rib.

3. The cooking apparatus according to claim 1, wherein the latch unit comprises:
    a support rib protruding from the inner surface of the movable rail to rotatably support the latch;
    wherein the latch comprises:
        a latch head;
        a latch body extending from a bottom surface of the latch head;
        a latch leg bent downward from a lower end of the latch body;
        a rotational shaft protruding from each of front and rear surfaces of the latch body; and
        a spring support rib, which protrudes from any point of the latch body, which corresponds to an upper side of the rotational shaft, and in which the elastic member is inserted.

4. The cooking apparatus according to claim 3, wherein an avoidance groove that is recessed by a predetermined depth from an upper end of the rear arm is defined to prevent the first end of the latch head, which passes through the upper hole, from interfering with the rear arm.

5. The cooking apparatus according to claimer 4, wherein a movement restriction hole is defined at any point of the fixed rail, and when a first end of the latch head is moved out of the upper hole, a second end of the latch head is inserted into the movement restriction hole to restrict the movement of the movable rail.

6. The cooking apparatus according to claim 1, further comprising at least one support rib protruding from an outer surface of the movable rail to support the arm member and restrict the rotation of the arm member at the same time.

7. The cooking apparatus according to claim 1, wherein each of the elevation devices further comprises a stopper unit disposed on a front end of the front arm and/or the rear arm, and wherein the stopper unit comprises:
    a cam fixed to the front end of the front arm and/or the rear arm to rotate as one body with the front arm and/or the rear arm; and
    a damper disposed at a rear side of the cam to restrict rotation of the cam.

8. The cooking apparatus according to claim 7, wherein a plurality of stopping grooves is defined in a circumferential surface of the cam, and wherein the damper comprises:
    a bracket;
    a bearing supporter provided to be movable in the frontward and rearward direction inside of the bracket;
    a bearing mounted onto a front end of the bearing supporter; and
    an elastic member that applies elastic free to the bearing supporter.

9. The cooking apparatus according to claim 8, wherein the bearing supporter comprises:
    a bearing shaft;
    a bearing accommodating portion that accommodates the bearing mounted on the bearing shaft; and
    a support rod.

10. The cooking apparatus according to claim 9, wherein the bracket includes a pair of side surfaces and a rear surface, and wherein the elastic member extends between the rear surface and the bearing accommodating portion and is inserted onto an outer surface of the support rod.

* * * * *